(12) United States Patent
Zhang et al.

(10) Patent No.: US 7,645,997 B2
(45) Date of Patent: Jan. 12, 2010

(54) POSITIONING OF PHOTODETECTION EVENTS

(75) Inventors: Jin Zhang, Mountain View, CA (US); Peter D. Olcott, Stanford, CA (US); Craig S. Levin, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 314 days.

(21) Appl. No.: 11/904,627

(22) Filed: Sep. 26, 2007

(65) Prior Publication Data

US 2009/0242773 A1    Oct. 1, 2009

Related U.S. Application Data

(60) Provisional application No. 60/848,102, filed on Sep. 29, 2006.

(51) Int. Cl.
*H01L 25/00* (2006.01)
(52) U.S. Cl. .............. 250/370.1; 250/370.11; 250/371
(58) Field of Classification Search .......... 250/370.1, 250/370.11, 371
See application file for complete search history.

(56) References Cited

U.S. PATENT DOCUMENTS

| 3,011,057 | A | 11/1961 | Anger |
| 4,672,542 | A * | 6/1987 | Roux et al. ............. 378/34 |
| 6,080,984 | A | 6/2000 | Friesenhahn |
| 6,459,085 | B1 * | 10/2002 | Chang et al. ......... 250/370.11 |
| 6,781,133 | B2 * | 8/2004 | Karplus et al. ......... 250/370.1 |
| 2005/0151084 | A1 | 7/2005 | Zibulevsky et al. |

* cited by examiner

*Primary Examiner*—David P Porta
*Assistant Examiner*—Jessica L Eley
(74) *Attorney, Agent, or Firm*—Lument Patent Firm

(57) ABSTRACT

Improved position estimation for a square photodetector having terminals at its corners is provided by first estimating an event position in a coordinate system aligned with the diagonals of the square, and then performing a coordinate rotation to provide an estimated position in a coordinate system aligned with the sides of the square. These two steps can also be mathematically combined. It is believed that the improved accuracy of this position determination approach is a result of a greater degree of linearity in charge division between terminals along diagonal axes than along orthogonal axes of a square detector. Flood images provided by this method have been compared to flood images provided by the conventional Anger method, and substantially less image distortion is observed with the present method than with the Anger method. This reduced distortion can enable automatic crystal segmentation from raw flood image data, which is particularly beneficial in connection with simplifying positron emission tomography (PET) system calibration.

14 Claims, 4 Drawing Sheets

$$X'_P = \frac{D-B}{D+B} \qquad Y'_P = \frac{A-C}{A+C}$$

$$X_P = X'_P \cos 45 - Y'_P \sin 45$$

$$Y_P = X'_P \sin 45 + Y'_P \cos 45$$

$$X_P = \frac{(C+D)-(A+B)}{A+B+C+D} \qquad Y_P = \frac{(A+D)-(B+C)}{A+B+C+D}$$

$$X'_P = \frac{D-B}{D+B} \qquad Y'_P = \frac{A-C}{A+C}$$

$$X_P = X'_P \cos 45 - Y'_P \sin 45$$

$$Y_P = X'_P \sin 45 + Y'_P \cos 45$$

POSITIONING OF PHOTODETECTION EVENTS

CROSS REFERENCE TO RELATED APPLICATIONS

This application claims the benefit of U.S. provisional patent application 60/848,102, filed on Sep. 29, 2006, entitled "Method of Positioning Scintillation Light Events in Scintillation Cameras", and hereby incorporated by reference in its entirety.

GOVERNMENT SPONSORSHIP

This invention was made with US government support under contract number R21 EB003283 awarded by NIH. The government has certain rights in this invention.

FIELD OF THE INVENTION

This invention relates to position determination for photoelectric events.

BACKGROUND

Determining the position of a photodetection event is useful in many circumstances, and various approaches have been developed for determining position. A conceptually straightforward approach is to employ a detector array having multiple small detector elements (i.e. pixels), each pixel being individually addressed, e.g., as considered in U.S. Pat. No. 6,080,984. However, a large number of electrical connections to the pixels can be required. For some applications, such as medical imaging by positron emission tomography (PET), the number of connections required by a pixelated detector array can be prohibitively large.

Accordingly, methods of determining the location of a photodetection event on the active surface of a single photodetector are also of interest. One approach is the so-called Anger algorithm, which has been known for a long time (e.g., it is described in U.S. Pat. No. 3,011,057), and is still in present-day use. The Anger algorithm is based on the idea of having multiple electrodes on the photodetector and computing event positions based on normalized differences of detector signals.

For example, FIG. 1 shows how the Anger algorithm would apply for the case of a square detector 102 having terminals $T_A$, $T_B$, $T_C$, and $T_D$ at its corners. These terminals provide corresponding signals A, B, C, and D. The problem of interest is to determine the coordinates $(X_P, Y_P)$ of a photodetection event P from the signals A, B, C and D. According to the Anger algorithm, estimates for these coordinates are given by $$X_P = \frac{(C+D)-(A+B)}{A+B+C+D} \tag{1a}$$

$$Y_P = \frac{(A+D)-(B+C)}{A+B+C+D} \tag{1b}$$

for the example of FIG. 1. The Anger algorithm is based on the assumption that terminal signals increase as the distance between P and the corresponding terminal decreases. For example, signal D from terminal $T_D$ would increase as the distance from P to $T_D$ decreases, and similarly for the other signals.

However, it is well known that location estimates provided by the Anger algorithm are not entirely accurate, with pincushion and/or barrel distortion being the most typical errors. This is not surprising, since the relation between event location and signal strengths provided by a photodetector in practice will not match the simple forms assumed in Eqs. 1a-b.

Accordingly, methods for compensating or correcting the position determination provided by the Anger algorithm have been investigated. Calibration maps or lookup tables have been employed in practice. Some such approaches have the significant drawback of being very time-consuming to implement (e.g., a single calibration run can take days). A trainable, model-based neural network position estimation algorithm is considered in US 2005/0151084.

However, a common feature of these compensation or correction methods is that they deal with correcting the results provided by an imperfect low-level position estimation algorithm (e.g., the Anger algorithm). Accordingly, it would be an advance in the art to provide improved position determination from a single, multi-electrode photodetector.

SUMMARY

Improved position estimation for a square photodetector having terminals at its corners is provided by first estimating an event position in a coordinate system aligned with the diagonals of the square, and then performing a coordinate rotation to provide an estimated position in a coordinate system aligned with the sides of the square. These two steps can also be mathematically combined. It is believed that the improved accuracy of this position determination approach is a result of a greater degree of linearity in charge division between terminals along diagonal axes than along orthogonal axes of a square detector. Flood images provided by this method have been compared to flood images provided by the conventional Anger method, and substantially less image distortion is observed with the present method than with the Anger method. This reduced distortion can enable automatic crystal segmentation from raw flood image data, which is particularly beneficial in connection with simplifying positron emission tomography (PET) system calibration.

DETAILED DESCRIPTION

Figure 2:
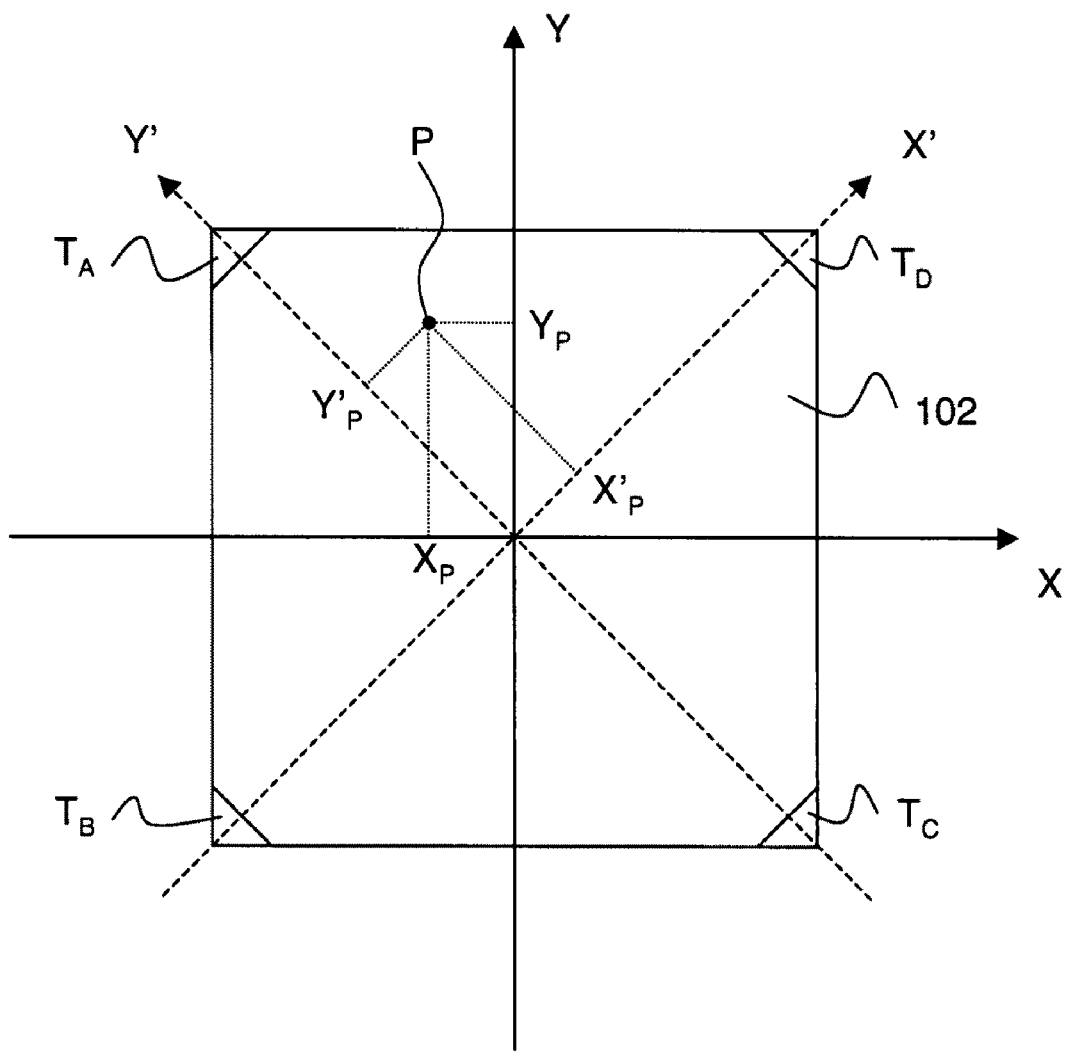
FIG. 2 shows a position determination method according to an embodiment of the invention.
Figure 3:
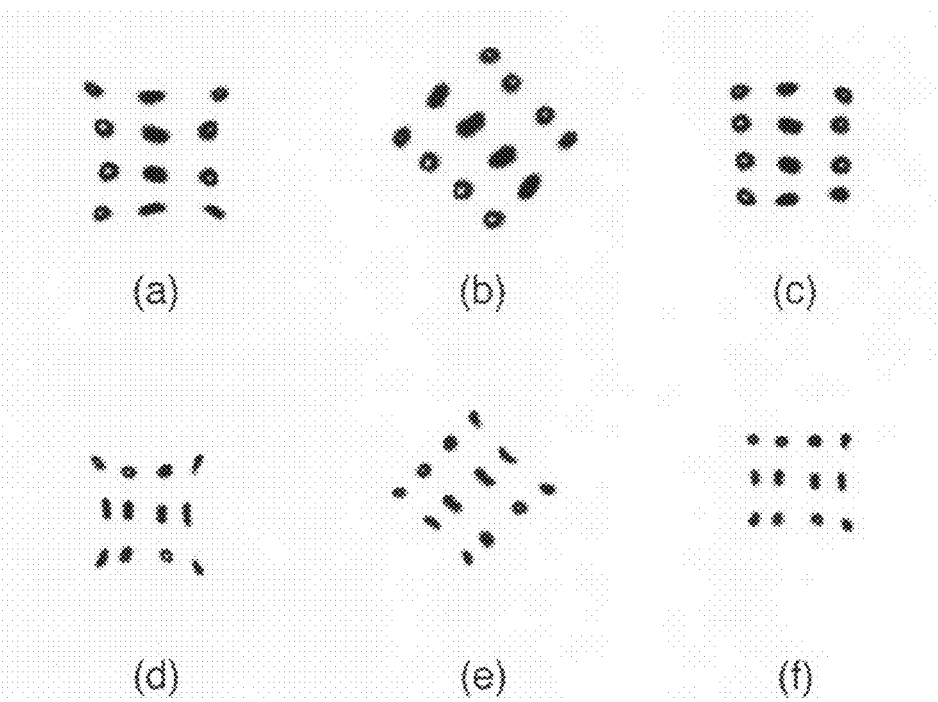
FIGS. 3a-f show a comparison of flood images processed according to a conventional position determination algorithm with flood images processed according to an embodiment of the invention.
Figure 4:
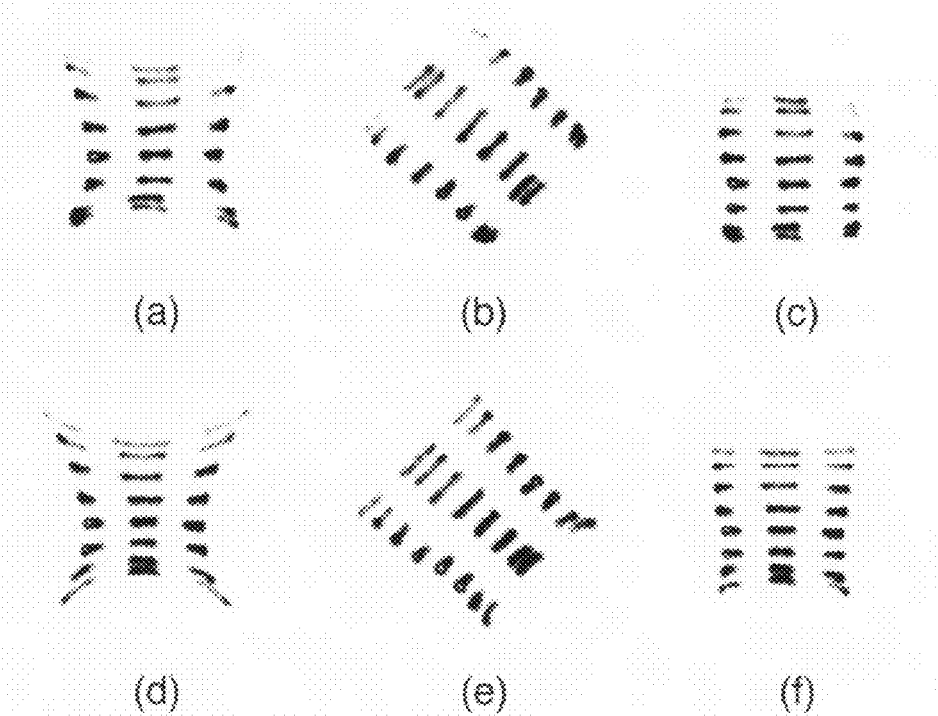
FIGS. 4a-f show another comparison of flood images processed according to a conventional position determination algorithm with flood images processed according to an embodiment of the invention.

FIG. 2 shows a position determination method according to an embodiment of the invention. In this embodiment, a square photodetector 102 has terminals $T_A$, $T_B$, $T_C$, and $T_D$ at its corners. Preferably, photodetector 102 is a position sensitive avalanche photodiode, but the invention can be employed in connection with any kind of photodetector having terminals at its corners and providing terminal signals responsive to photodetection event position. These terminals provide corresponding signals A, B, C, and D. In this embodiment, the X-Y coordinates of photodetection event P are determined by a two step process. In the first step, estimates of the X'-Y' coordinates of P are obtained, and in the second step, a coordinate rotation from the X'-Y' coordinate system to the X-Y coordinate system is performed to provide the desired X-Y coordinates of P.

As shown on FIG. 2, the X'-Y' coordinate system is aligned with the diagonals of photodetector 102. In this specific example, the X' axis is aligned with diagonally opposite terminals $T_B$ and $T_D$, and the Y' axis is aligned with diagonally opposite terminals $T_A$ and $T_C$. Estimates of the X'-Y' coordinates of P, denoted $X'_P$ and $Y'_P$ respectively, are given by $$X'_P = \frac{D - B}{D + B} \quad (2a)$$

$$Y'_P = \frac{A - C}{A + C} \quad (2b)$$

for this example. Eqs. 2a-b are consistent with the following qualitative observations: signal D increases as P approaches terminal $T_D$ (i.e., as X' increases), and signal B increases as P approaches terminal $T_B$ (i.e., as X' decreases). Similarly, signal A increases as P approaches terminal $T_A$ (i.e., as Y' increases), and signal C increases as P approaches terminal $T_C$ (i.e., as Y' decreases).

Once the estimated X'-Y' coordinates of P are obtained, a coordinate rotation can be employed to obtain the corresponding estimated X-Y coordinates of P. In this case, a coordinate rotation of −45° takes the X'-Y' coordinates over to the X-Y coordinates. The corresponding coordinate transformation is given by $$X_P = X'_P \cos 45 - Y'_P \sin 45$$

$$Y_P = X'_P \sin 45 + Y'_P \cos 45 \quad (3)$$

for this example. Other mathematically equivalent ways of transforming from the diagonal coordinates (X'-Y') to the orthogonal coordinates (X-Y) can also be employed in practicing the invention (e.g., a rotation by any odd multiple of 45°). The resulting estimates $X_P$ and $Y_P$ can be provided as an output, either to an end user, or to a system for further processing of such position data (e.g., a medical imaging system).

Figure 1:
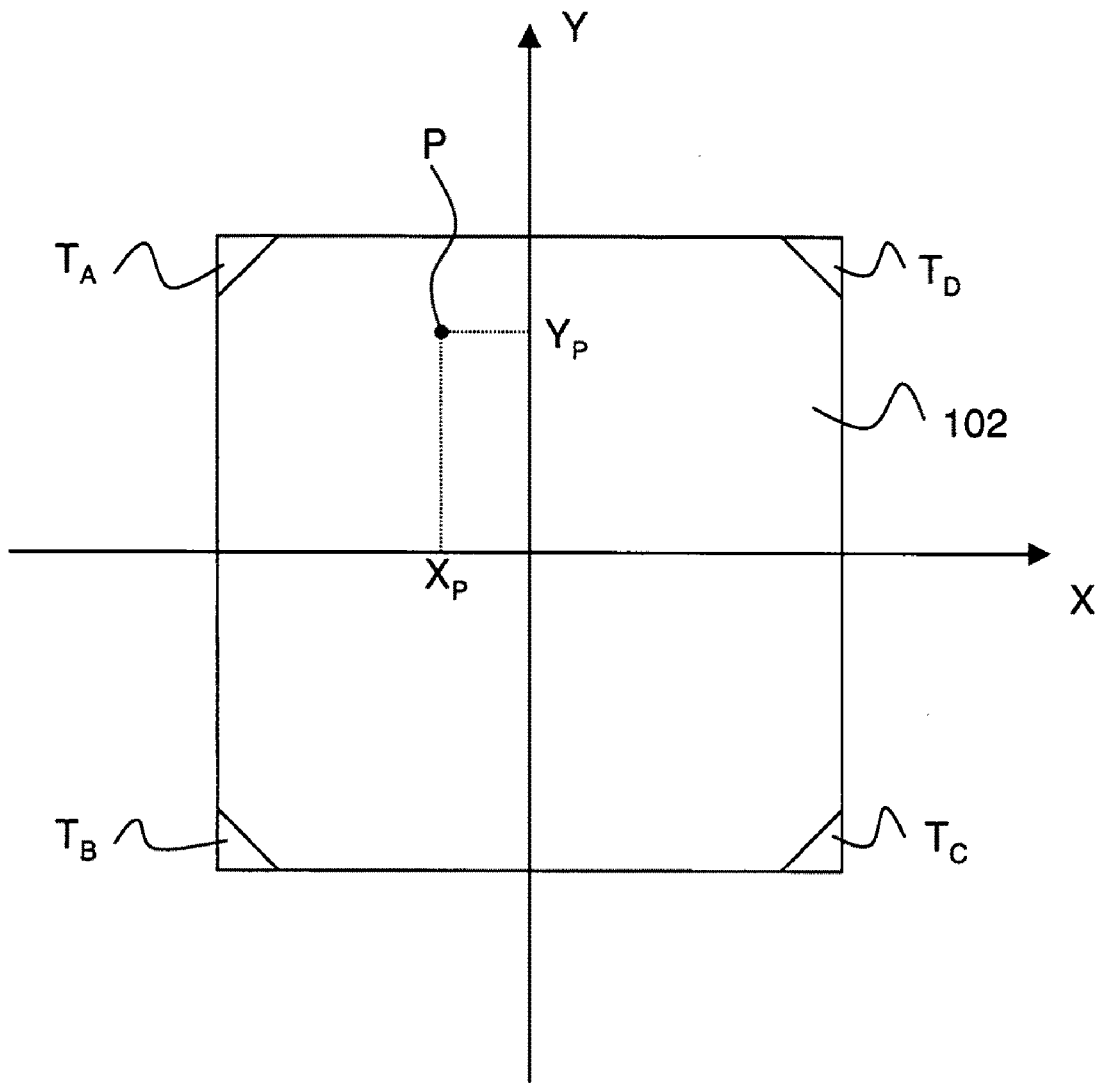
FIG. 1 shows a prior art position determination method.

The difference between this method and the conventional method of FIG. 1 can be made more explicit by combining Eqs. 2a-b and 3 to obtain:

$$X_P = \frac{\sqrt{2}(CD - AB)}{(D + B)(A + C)} \quad (4a)$$

$$Y_P = \frac{\sqrt{2}(AD - BC)}{(D + B)(A + C)} \quad (4b)$$

which can be compared to Eqs. 1a-b of the conventional Anger method. In Eqs. 4a-b, it is apparent that a normalized difference of signal products is used to provide location estimates, as opposed to the simpler normalized signal differences of Eqs. 1a-b. It is believed that the improved accuracy of this position determination approach is a result of a greater degree of linearity in charge division between terminals along diagonal axes than along orthogonal axes of a square detector.

Eqs. 4a-b can be understood as basing the $X_P$ estimate on normalizing the difference CD-AB and the $Y_P$ estimate on normalizing the difference AD-BC. In principle, any second-degree, multi-variable polynomial in the variables A, B, C, and D can be employed as the normalizing denominator, although investigations have shown that some normalization approaches work better than others. For example, normalization by (D+B)(A+C) as in Eqs. 4a-b works well. Other normalizations that work well include AB+AC+AD+BC+BD+CD and $(A+B+C+D)^2$. In contrast, normalizing with $A^2+B^2+C^2+D^2$ does not work so well. Normalizing with a non-second degree function (e.g., A+B+C+D) does not work well either, which is expected because A+B+C+D is linear in its variables, so the resulting estimates for $X_P$ and $Y_P$ undesirably have physical units (e.g., Volts) inherited from the units of signals A, B, C, and D.

The conventional position estimates of Eqs. 1a-b and the position estimates of the embodiments of Eqs. 2a-b, 3, and 4a-b are actually estimates of relative coordinates, since the scaling factor for converting dimensionless signal ratios to physical distance coordinates (e.g., distance in mm) is omitted. In many cases, such as automatic segmentation of scintillation crystals in a PET system by automatic analysis of flood images, such relative coordinates are sufficient. In cases where estimates of physical distance coordinates are desired, a calibration can be employed to determine this scaling factor. Since overall scale factors can be added to or omitted from relative coordinates without affecting their validity as relative coordinates, the factors of $\sqrt{2}$ can equivalently be omitted from or retained in both of Eqs. 4a-b. However, it would be incorrect to omit the $\sqrt{2}$ from one of Eqs. 4a-b and retain the $\sqrt{2}$ in the other of Eqs. 4a-b, since that would distort the image by scaling one dimension without a corresponding scaling of the other dimension.

The position estimates provided by the above-described methods are referred to as estimates of relative position because of the above-described overall scale ambiguity. Accuracy of such relative position estimates can be assessed by providing a known input pattern (e.g., a regular array of optical sources), and observing the level of distortion in the output relative position estimates. Ideally, such output would be an undistorted copy of the input pattern, with arbitrary scale. Thus, distortion in the output image is a suitable performance measure for relative positioning methods.

Position determination according to embodiments of the invention is particularly useful in connection with medical imaging application based on detecting high energy (i.e., non-visible) photons. Such photons can be detected by providing a scintillation material, in which the high energy photon is received and can interact to provide optical radiation. Detection of such optical radiation can be with a position sensitive photodetector as described above. The position of the optical radiation can be determined according to the above-described method. The position of the initial high energy photon can be determined from the location of the optical radiation.

Surprisingly, the present inventors have found that position determination according to the method of Eqs. 2a-b and 3 (or, equivalently, of Eqs. 4a-b) performs substantially better than the conventional approach of FIG. 1 and Eqs. 1a-b. The performance of these two approaches has been directly compared using scintillation flood images. Such flood images can be obtained by placing an array of scintillation crystals in proximity to a single position sensitive photodetector. The scintillation crystals are irradiated uniformly with high energy radiation, and an image is formed of the resulting scintillation radiation as detected by the position sensitive detector. Comparison is performed by taking the same raw data (i.e., the signals A, B, C, and D), and determining position according to the conventional method of FIG. 1 and according to the embodiment of FIG. 2. FIGS. 3a-f, 4a-f, and 5a-b show results of such flood image comparisons.

The results of FIGS. 3a-f relate to a 3×4 array of 2×2×3 mm$^3$ Lutetium Oxyorthosilicate (LSO) scintillation crystals. Images (a) and (d) are generated with the conventional Anger algorithm of Eqs. 1a-b. Images (b) and (e) are the X'-Y' images as provided by Eqs. 2a-b. Images (c) and (f) are the final X-Y images as provided by Eqs. 3. The distortion in images (c) and (f) provided by an embodiment of the invention are substantially less than the significant pin-cushion distortion in the corresponding images (a) and (d) provided by the conventional Anger method. Images (a)-(c) were acquired with a conventional position sensitive avalanche photodiode (PSAPD), while images (d)-(f) were acquired with a thin, flex-mounted PSAPD. The substantial improvement provided by this embodiment of the invention is readily apparent for both detector types.

The results of FIGS. 4a-f relate to a 3×8 array of 1×1×3 mm$^3$ LSO scintillation crystals. Images (a) and (d) are generated with the conventional Anger algorithm of Eqs. 1a-b. Images (b) and (e) are the X'-Y' images as provided by Eqs. 2a-b. Images (c) and (f) are the final X-Y images as provided by Eqs. 3. The distortion in images (c) and (f) provided by an embodiment of the invention are substantially less than the significant pin-cushion distortion in the corresponding images (a) and (d) provided by the conventional Anger method. Images (a)-(c) were acquired with a conventional position sensitive avalanche photodiode (PSAPD), while images (d)-(f) were acquired with a thin, flex-mounted PSAPD. The substantial improvement provided by this embodiment of the invention is readily apparent for both detector types.

For the 3×8 array of LSO crystals of FIGS. 4a-f, half of the array had a polished surface treatment, while the other half had ground surfaces (i.e., "as cut"). All crystals of the 3×4 array of FIGS. 3a-f had ground surfaces. The improved positioning accuracy provided by this embodiment of the invention in this example does not depend on the crystal surface condition.

Figure 5A:
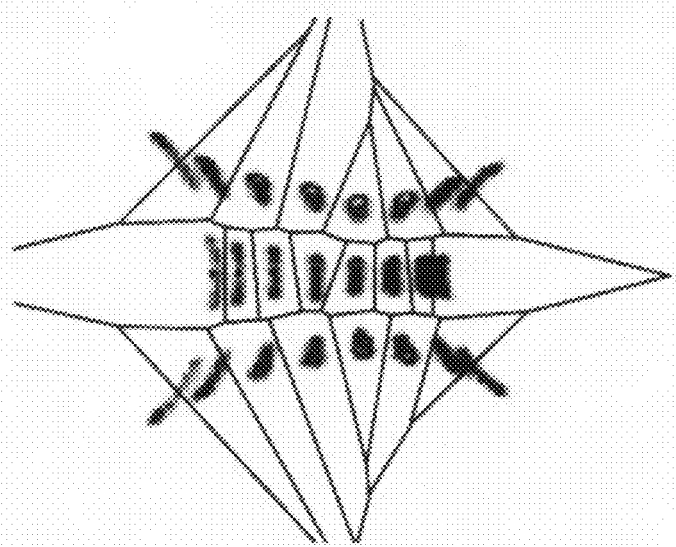
FIG. 5a shows a result of an automatic segmentation algorithm applied to a flood image processed according to a conventional position determination algorithm.

The pin-cushion distortion is a serious problem when crystal segmentation is required to measure and calibrate energy resolution and crystal location for tiny individual crystals from a flood positioning histogram. In a calibration step for a PET system, individual crystals are mapped with a lookup table to determine parameters such as energy and coincidence time windows and efficiencies for individual crystals. With an Anger-like algorithm, an automatic algorithm for crystal segmentation from the flood image may not be possible for crystals near corners of the PSAPD, because of the severe pin-cushion distortion. For example, FIG. 5a shows results of a crystal segmentation algorithm applied to a flood image generated according to the Anger algorithm. Here it is apparent that the calculated crystal boundaries (black lines) are significantly in error, and even bisect the corner crystals.

Figure 5B:
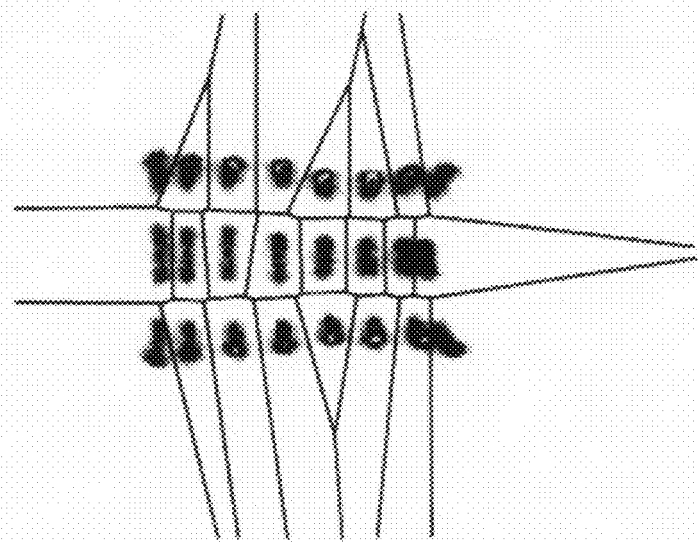
FIG. 5b shows a result of an automatic segmentation algorithm applied to a flood image processed according to an embodiment of the invention.

In sharp contrast, FIG. 5b shows results of the same crystal segmentation algorithm applied to a flood image provided according to an embodiment of the invention. The reduced level of image distortion enables the segmentation algorithm to provide more accurate calculated crystal boundaries. Since accurate segmentation can be performed based on raw flood image data, creation of positioning look-up calibration tables for a PET system can be substantially simplified.

The previous description has been by way of example as opposed to limitation. Practice of the invention also includes many variations of the given examples. For example, practice of the invention does not depend critically on coordinate sign conventions, or on the specific labeling of the terminals and terminal signals. Any rotation which brings the diagonal coordinates (X'-Y') into alignment with the orthogonal coordinates (X-Y) can be employed in practicing the invention. Thus rotations through any odd multiple of 45° can be employed. Practice of the invention does not critically depend on details of the photodetector design and/or materials, nor does it depend critically on the configuration and/or composition of any scintillation material that may be present. Practice of the invention does not depend critically on how the position estimate is separated into various numbers and combinations of mathematically equivalent steps. For example, the method of Eqs. 2a-b and 3 is equivalent to the method of Eqs. 4a-b due to the mathematical equivalence of these equations.

The invention claimed is:

1. A method of determining a relative position of a photodetection event, the method comprising:
   providing a substantially square photodetector having terminals $T_A$, $T_B$, $T_C$, and $T_D$ at its corners, wherein said terminals $T_A$ and $T_C$ are diagonally opposite to each other, and wherein said terminals $T_B$ and $T_D$ are diagonally opposite to each other;
   measuring signals A, B, C, and D from terminals $T_A$, $T_B$, $T_C$, and $T_D$, respectively, responsive to said photodetection event;
   computing a first relative diagonal position $X'_P$ of said photodetection event from said signals B and D;
   computing a second relative diagonal position $Y'_P$ of said photodetection event from said signals A and C;
   computing a relative orthogonal X-Y position of said photodetection event from said relative diagonal positions $X'_P$ and $Y'_P$;
   providing said relative orthogonal X-Y position of said photodetection event as an output.

2. The method of claim 1, wherein said photodetector comprises a position-sensitive avalanche photodiode.

3. The method of claim 1, wherein said computing a first diagonal position $X'_P$ comprises setting $X'_P$ equal to (D−B)/(D+B).

4. The method of claim 1, wherein said computing a second diagonal position $Y'_P$ comprises setting $Y'_P$ equal to (A−C)/(A+C).

5. The method of claim 1, wherein said computing an orthogonal X-Y position comprises a coordinate rotation of said diagonal positions $X'_P$ and $Y'_P$ by an odd integer multiple of 45°.

6. The method of claim 1, wherein said terminals $T_C$ and $T_D$ have positive X coordinates, wherein said terminals $T_A$ and $T_D$ have positive Y coordinates, wherein said terminal $T_D$ has a positive X' coordinate, wherein said terminal $T_A$ has a positive Y' coordinate and wherein said coordinate rotation of said diagonal positions $X'_P$ and $Y'_P$ is a rotation of −45°.

7. The method of claim 6, wherein said coordinate rotation comprises setting $X_P$ equal to $X'_P \cos 45° - Y'_P \sin 45°$ and setting $Y_P$ equal to $Y'_P \cos 45° + X'_P \sin 45°$.

8. The method of claim 1, further comprising computing a physical orthogonal X-Y position of said photodetection event based on a calibration relating said relative orthogonal X-Y position to said physical orthogonal X-Y position.

9. A method of determining an interaction position of a high energy photon, the method comprising:
  providing a scintillation material;
  receiving said high energy photon in said scintillation material, wherein said high energy photon interacts with said scintillation material to emit optical radiation from said interaction position;
  detecting said optical radiation;
  determining a relative position of said optical radiation according to the method of claim 1;
  determining a location of said interaction position from said location of said optical radiation.

10. A method of determining a relative position of a photodetection event, the method comprising:
  providing a substantially square photodetector having terminals $T_A$, $T_B$, $T_C$, and $T_D$ at its corners, wherein said terminals $T_A$ and $T_C$ are diagonally opposite to each other, wherein said terminals $T_B$ and $T_D$ are diagonally opposite to each other, wherein said terminals $T_C$ and $T_D$ have positive X coordinates, and wherein said terminals $T_A$ and $T_D$ have positive Y coordinates;
  measuring signals A, B, C, and D from terminals $T_A$, $T_B$, $T_C$, and $T_D$, respectively, responsive to said photodetection event;
  computing a first numerator $N_1$, wherein $N_1 = CD - AB$;
  computing a second numerator $N_2$, wherein $N_2 = AD - BC$;
  computing first and second relative orthogonal positions $X_P$ and $Y_P$ of said photodetection event, wherein $X_P = N_1/f$, $Y_P = N_2/f$, and wherein f is a second degree polynomial in the variables A, B, C, D;
  providing said relative orthogonal positions $X_P$ and $Y_P$ of said photodetection event as an output.

11. The method of claim 10, wherein said photodetector comprises a position-sensitive avalanche photodiode.

12. The method of claim 10, further comprising computing a physical orthogonal X-Y position of said photodetection event based on a calibration relating said relative orthogonal position $X_P$ and $Y_P$ to said physical orthogonal X-Y position.

13. A method of determining an interaction position of a high energy photon, the method comprising:
  providing a scintillation material;
  receiving said high energy photon in said scintillation material, wherein said high energy photon interacts with said scintillation material to emit optical radiation from said interaction position;
  detecting said optical radiation;
  determining a relative position of said optical radiation according to the method of claim 10;
  determining a location of said interaction position from said location of said optical radiation.

14. The method of claim 10, wherein f is selected from the group consisting of: $(D+B)(A+C)$, $AB+AC+AD+BC+BD+CD$ and $(A+B+C+D)^2$.

* * * * *

UNITED STATES PATENT AND TRADEMARK OFFICE
CERTIFICATE OF CORRECTION

PATENT NO.         : 7,645,997 B2
APPLICATION NO.    : 11/904627
DATED              : January 12, 2010
INVENTOR(S)        : Zhang et al.

Page 1 of 1

It is certified that error appears in the above-identified patent and that said Letters Patent is hereby corrected as shown below:

Column 1:

• Please replace lines 13-17 with:

-- FEDERALLY SPONSORED RESEARCH OR DEVELOPMENT
This invention was made with Government support under contracts CA098691 and EB003283 awarded by the National Institutes of Health. The Government has certain rights in this invention. --

Signed and Sealed this
Fifth Day of April, 2011

David J. Kappos
*Director of the United States Patent and Trademark Office*